US010145067B2

(12) United States Patent
Zhao et al.

(10) Patent No.: US 10,145,067 B2
(45) Date of Patent: *Dec. 4, 2018

(54) METHOD OF IMPROVING DEWATERING EFFICIENCY, INCREASING SHEET WET WEB STRENGTH, INCREASING SHEET WET STRENGTH AND ENHANCING FILLER RETENTION IN PAPERMAKING

(71) Applicant: ECOLAB USA, INC., St. Paul, MN (US)

(72) Inventors: Yulin Zhao, Shanghai (CN); Jun Li, Huangshi (CN); Qing Long Rao, Shanghai (CN); Stephen Ashton, St. Charles, IL (US); Weiguo Cheng, Naperville, IL (US); Aleksandar Todorovic, Helsinki (FI); Alan Smith, Sandbach (GB)

(73) Assignee: ECOLAB USA INC., St. Paul, MN (US)

( * ) Notice: Subject to any disclaimer, the term of this patent is extended or adjusted under 35 U.S.C. 154(b) by 70 days.

This patent is subject to a terminal disclaimer.

(21) Appl. No.: 15/271,441

(22) Filed: Sep. 21, 2016

(65) Prior Publication Data

US 2017/0009399 A1    Jan. 12, 2017

Related U.S. Application Data

(63) Continuation of application No. 13/919,167, filed on Jun. 17, 2013, now Pat. No. 9,487,916, which is a (Continued)

(51) Int. Cl.
*D21H 17/37* (2006.01)
*D21H 21/20* (2006.01)
(Continued)

(52) U.S. Cl.
CPC .............. *D21H 17/375* (2013.01); *D21C 3/02* (2013.01); *D21C 5/00* (2013.01); *D21C 5/025* (2013.01);
(Continued)

(58) Field of Classification Search
None
See application file for complete search history.

(56) References Cited

U.S. PATENT DOCUMENTS 2,037,525 A    4/1936 Marantz
2,113,034 A    4/1938 Rowland et al.
(Continued)

FOREIGN PATENT DOCUMENTS

CA    1306084 C    8/1992
CA    2176898 C    10/2006
(Continued)

OTHER PUBLICATIONS

Smook, Gary A., Handbook for Pulp and Paper Technologists, 2nd ed, Angus Wilde Publications, 1992, p. 220.*
(Continued)

*Primary Examiner* — Dennis R Cordray
(74) *Attorney, Agent, or Firm* — Eric D. Babych; Brinks Gilson & Lione

(57) ABSTRACT

Methods of improving dewatering efficiency, increasing sheet wet web strength, increasing sheet wet strength, and enhancing filler retention in a papermaking process are disclosed. The methods improve the efficiency of drainage aids, wet web strength aids, and/or wet strength aids by coating at least some of the filler particles with a material that prevents the filler materials form adhering to a those additives.

12 Claims, 2 Drawing Sheets

Related U.S. Application Data continuation-in-part of application No. 13/449,888, filed on Apr. 18, 2012, now Pat. No. 8,747,617, application No. 15/271,441, which is a continuation of application No. 12/323,976, filed on Nov. 26, 2008, now Pat. No. 8,088,250, and a continuation-in-part of application No. 11/854,044, filed on Sep. 12, 2007, now Pat. No. 8,172,983.

(51) Int. Cl.
*D21H 21/18* (2006.01)
*D21H 17/67* (2006.01)
*D21H 21/10* (2006.01)
*D21C 3/02* (2006.01)
*D21C 5/00* (2006.01)
*D21C 5/02* (2006.01)
*D21H 17/69* (2006.01)
*D21H 17/00* (2006.01)
*D21H 17/66* (2006.01)

(52) U.S. Cl.
CPC .......... *D21H 17/675* (2013.01); *D21H 17/69* (2013.01); *D21H 17/74* (2013.01); *D21H 21/10* (2013.01); *D21H 21/18* (2013.01); *D21H 21/20* (2013.01); *D21H 17/66* (2013.01); *Y02W 30/648* (2015.05)

(56) References Cited

U.S. PATENT DOCUMENTS

| | | |
|---|---|---|
| 2,322,185 A | 6/1943 | Bicknell |
| 2,328,537 A | 9/1943 | Felton et al. |
| 2,601,597 A | 6/1952 | Daniel, Jr. et al. |
| 2,805,966 A | 9/1957 | Etheridge |
| 2,949,397 A | 8/1960 | Werner et al. |
| 2,982,749 A | 5/1961 | Friedrich et al. |
| 3,102,064 A | 8/1963 | Wurzburg et al. |
| 3,184,373 A | 5/1965 | Arledter |
| 3,233,962 A | 2/1966 | Nelson |
| 3,234,076 A | 2/1966 | Goldsmith |
| 3,235,490 A | 2/1966 | Goren |
| 3,269,891 A | 8/1966 | Reynolds et al. |
| 3,284,393 A | 11/1966 | Vanderhoff et al. |
| 3,409,500 A | 11/1968 | Strazdins et al. |
| 3,555,932 A | 7/1969 | Schwerdhofer |
| 3,556,932 A | 1/1971 | Coscia et al. |
| 3,734,873 A | 5/1973 | Anderson et al. |
| 3,772,076 A | 11/1973 | Keim |
| 3,821,069 A | 6/1974 | Wurzburg |
| 3,840,489 A | 10/1974 | Strazdins |
| 3,873,336 A | 3/1975 | Lambert et al. |
| RE28,474 E | 7/1975 | Anderson et al. |
| RE28,576 E | 10/1975 | Anderson et al. |
| 3,968,005 A | 7/1976 | Wurzburg |
| 4,040,900 A | 8/1977 | Mazzarella et al. |
| 4,181,567 A | 1/1980 | Riddell et al. |
| 4,217,425 A | 8/1980 | Ballweber et al. |
| 4,233,411 A | 11/1980 | Ballweber et al. |
| 4,272,297 A | 6/1981 | Brooks et al. |
| 4,295,933 A | 10/1981 | Smith |
| 4,305,826 A | 12/1981 | Moses |
| 4,382,864 A | 5/1983 | Hashimoto et al. |
| 4,415,690 A | 11/1983 | Grimm |
| 4,493,659 A | 1/1985 | Iwashita |
| 4,495,245 A | 1/1985 | Zunker |
| 4,508,594 A | 4/1985 | Jansma et al. |
| 4,533,434 A | 8/1985 | Yoshioka et al. |
| 4,569,768 A | 2/1986 | McKinley |
| 4,603,176 A | 7/1986 | Bjorkquist et al. |
| 4,605,702 A | 8/1986 | Guerro et al. |
| 4,609,431 A | 9/1986 | Grose et al. |
| 4,657,946 A | 4/1987 | Rende et al. |
| 4,710,270 A | 12/1987 | Sundén et al. |
| 4,744,985 A | 5/1988 | Tamai et al. |
| 4,799,946 A | 1/1989 | Ainslie et al. |
| 4,799,964 A | 1/1989 | Harvey et al. |
| 4,816,166 A | 3/1989 | Cawiezel |
| 4,841,040 A | 6/1989 | Just et al. |
| 4,871,251 A | 10/1989 | Preikschat et al. |
| 4,889,594 A | 12/1989 | Gavelin |
| 4,915,786 A | 4/1990 | Sweeney |
| 4,919,821 A | 4/1990 | Fong et al. |
| 4,925,530 A | 5/1990 | Sinclair et al. |
| 4,929,655 A | 5/1990 | Takeda et al. |
| 4,943,349 A | 7/1990 | Gomez |
| 4,956,399 A | 9/1990 | Kozakiewicz et al. |
| 5,006,590 A | 4/1991 | Takeda et al. |
| 5,017,268 A | 5/1991 | Clitherow et al. |
| 5,098,520 A | 3/1992 | Begala |
| 5,126,014 A | 6/1992 | Chung |
| 5,147,908 A | 9/1992 | Floyd et al. |
| 5,167,766 A | 12/1992 | Honig et al. |
| 5,185,062 A | 2/1993 | Begala |
| 5,185,135 A | 2/1993 | Pillai et al. |
| 5,221,435 A | 6/1993 | Smith, Jr. |
| 5,244,542 A | 9/1993 | Bown et al. |
| 5,281,307 A | 1/1994 | Smigo et al. |
| 5,324,792 A | 6/1994 | Ford |
| 5,338,816 A | 8/1994 | Ramesh et al. |
| 5,384,013 A | 1/1995 | Husband et al. |
| 5,438,087 A | 8/1995 | Ikeda et al. |
| 5,458,679 A | 10/1995 | Fairchild |
| 5,466,337 A | 11/1995 | Darlington et al. |
| 5,474,856 A | 12/1995 | Tamagawa et al. |
| 5,490,904 A | 2/1996 | Jansma et al. |
| 5,501,774 A | 3/1996 | Burke |
| 5,571,380 A | 11/1996 | Fallon |
| 5,597,858 A | 1/1997 | Ramesh et al. |
| 5,597,859 A | 1/1997 | Hurlock et al. |
| 5,605,970 A | 2/1997 | Selvarajan |
| 5,620,510 A | 4/1997 | Mentzer et al. |
| 5,653,915 A | 8/1997 | Pardikes |
| 5,654,198 A | 8/1997 | Carrier et al. |
| 5,674,362 A | 10/1997 | Underwood et al. |
| 5,676,746 A | 10/1997 | Brown |
| 5,681,480 A | 10/1997 | Langley et al. |
| 5,695,733 A | 12/1997 | Kroc et al. |
| 5,759,346 A | 6/1998 | Vinson |
| 5,777,086 A | 7/1998 | Klyosov et al. |
| 5,779,859 A | 7/1998 | Carter et al. |
| 5,783,041 A | 7/1998 | Underwood |
| 5,785,813 A | 7/1998 | Smith et al. |
| 5,830,364 A | 11/1998 | Bleakley |
| 5,837,776 A | 11/1998 | Selvaragan et al. |
| 5,865,951 A | 2/1999 | Kawakami et al. |
| 5,891,304 A | 4/1999 | Wong Shing |
| 5,938,937 A | 8/1999 | Sparapany et al. |
| 5,958,180 A | 9/1999 | Hubbe et al. |
| 5,961,782 A | 10/1999 | Luu et al. |
| 5,985,992 A | 11/1999 | Chen |
| 5,989,391 A | 11/1999 | Watanabe et al. |
| 5,993,670 A | 11/1999 | Knauer |
| 6,013,705 A | 1/2000 | Chen et al. |
| 6,013,708 A | 1/2000 | Mallon et al. |
| 6,033,524 A | 3/2000 | Pruszynski et al. |
| 6,048,438 A | 4/2000 | Rosencrance et al. |
| 6,059,928 A | 5/2000 | Van Luu et al. |
| 6,071,379 A | 6/2000 | Wong Shing et al. |
| 6,077,394 A | 6/2000 | Spence et al. |
| 6,083,348 A | 7/2000 | Auhorn et al. |
| 6,159,381 A | 12/2000 | Bleakley et al. |
| 6,190,499 B1 | 2/2001 | Oriaran et al. |
| 6,190,663 B1 | 2/2001 | Hawkins et al. |
| 6,214,166 B1 | 4/2001 | Münchow |
| 6,238,520 B1 | 5/2001 | Greenwood |
| 6,238,521 B1 | 5/2001 | Shing et al. |
| 6,245,874 B1 | 6/2001 | Staib et al. |
| 6,313,246 B1 | 11/2001 | Carter et al. |
| 6,315,866 B1 | 11/2001 | Sanchez |
| 6,348,132 B1 | 2/2002 | Zhang et al. |
| 6,426,383 B1 | 7/2002 | Fong et al. |
| 6,444,091 B1 | 9/2002 | Ward et al. |

(56) References Cited

U.S. PATENT DOCUMENTS

| | | |
|---|---|---|
| 6,444,092 B1 | 9/2002 | Münchow |
| 6,455,661 B1 | 9/2002 | Antal et al. |
| 6,472,487 B2 | 10/2002 | Schroeder et al. |
| 6,491,790 B1 | 12/2002 | Proverb et al. |
| 6,524,439 B2 | 2/2003 | Chen et al. |
| 6,562,196 B1 | 5/2003 | Huovila et al. |
| 6,592,718 B1 | 7/2003 | Wong Shing et al. |
| 6,605,674 B1 | 8/2003 | Whipple et al. |
| 6,610,209 B1 | 8/2003 | Sommese et al. |
| 6,616,807 B1 | 9/2003 | Dyllick-Brenzinger et al. |
| 6,696,067 B2 | 2/2004 | Brandt et al. |
| 6,699,359 B1 | 3/2004 | Luu et al. |
| 6,723,204 B2 | 4/2004 | Van Handel et al. |
| 6,733,674 B2 | 5/2004 | Sarkar et al. |
| 6,743,335 B2 | 6/2004 | Proverb et al. |
| 6,746,542 B1 | 6/2004 | Lorencak et al. |
| 6,787,574 B1 | 9/2004 | Farley et al. |
| 6,815,497 B1 | 11/2004 | Luu et al. |
| 6,835,282 B2 | 12/2004 | Harvey et al. |
| 6,939,443 B2 | 9/2005 | Ryan et al. |
| 7,034,087 B2 | 4/2006 | Hagiopol et al. |
| 7,097,346 B2 | 8/2006 | Bergman |
| 7,119,148 B2 | 10/2006 | Hagiopol et al. |
| 7,125,469 B2 | 10/2006 | Barcus et al. |
| 7,211,608 B2 | 5/2007 | Niinikoski et al. |
| 7,291,695 B2 | 11/2007 | Wei et al. |
| 7,323,510 B2 | 1/2008 | Fischer et al. |
| 7,455,751 B2 | 11/2008 | Ward et al. |
| 7,488,403 B2 | 2/2009 | Hagiopol et al. |
| 7,550,060 B2 | 6/2009 | Jacobson et al. |
| 7,615,135 B2 | 11/2009 | Harrington et al. |
| 7,638,017 B2 | 12/2009 | Gane et al. |
| 7,641,766 B2 | 1/2010 | St. John et al. |
| 7,641,776 B2 | 1/2010 | Nagar et al. |
| 7,682,488 B2 | 3/2010 | Yeh et al. |
| 7,683,121 B2 | 3/2010 | Wei et al. |
| 7,740,743 B2 | 6/2010 | Singh et al. |
| 7,794,565 B2 | 9/2010 | Shannon et al. |
| 7,828,934 B2 | 11/2010 | Cyr et al. |
| 7,842,165 B2 | 11/2010 | Shevchenko et al. |
| 7,863,395 B2 | 1/2011 | Hagiopol et al. |
| 7,887,629 B2 | 2/2011 | Münchow |
| 7,897,013 B2 | 3/2011 | Hagiopol et al. |
| 7,901,543 B2 | 3/2011 | St. John et al. |
| 7,914,646 B2 | 3/2011 | Duggirala et al. |
| 7,938,934 B2 | 5/2011 | Todorovic et al. |
| 7,951,265 B2 | 5/2011 | Esser et al. |
| 7,972,478 B2 | 7/2011 | Hund et al. |
| 8,025,924 B2 | 9/2011 | Ohira et al. |
| 8,070,914 B2 | 12/2011 | Ryan et al. |
| 8,088,213 B2 | 1/2012 | Cheng et al. |
| 8,088,250 B2 | 1/2012 | Cheng et al. |
| 8,097,126 B2 | 1/2012 | Haehnle et al. |
| 8,172,983 B2 | 5/2012 | Cheng et al. |
| 8,288,502 B2 | 10/2012 | Bode et al. |
| 8,298,508 B2 | 10/2012 | Wang et al. |
| 8,343,312 B2 | 1/2013 | Mahr et al. |
| 8,349,134 B2 | 1/2013 | Esser et al. |
| 8,382,947 B2 | 2/2013 | Skaggs et al. |
| 8,404,083 B2 | 3/2013 | Haehnle et al. |
| 8,414,739 B2 | 4/2013 | Kimura et al. |
| 8,419,899 B2 | 4/2013 | Xia et al. |
| 8,425,724 B2 | 4/2013 | Ryan et al. |
| 8,444,818 B2 | 5/2013 | Sutman et al. |
| 8,454,798 B2 | 6/2013 | Ban et al. |
| 8,465,623 B2 | 6/2013 | Zhao et al. |
| 8,636,875 B2 | 1/2014 | McKay |
| 8,647,472 B2 | 2/2014 | Cheng et al. |
| 8,696,869 B2 | 4/2014 | Borkar et al. |
| 8,709,207 B2 | 4/2014 | Grimm et al. |
| 8,709,208 B2 | 4/2014 | Zhao et al. |
| RE44,936 E | 6/2014 | St. John et al. |
| 8,747,617 B2 | 6/2014 | Cheng et al. |
| 8,753,480 B2 | 6/2014 | Bode et al. |
| 8,840,759 B2 | 9/2014 | Benz et al. |
| 8,852,400 B2 | 10/2014 | St. John et al. |
| 8,882,964 B2 | 11/2014 | Zhao et al. |
| 8,894,817 B1 | 11/2014 | Cheng et al. |
| 8,920,606 B2 | 12/2014 | Wright |
| 8,999,111 B2 | 4/2015 | Castro et al. |
| 9,011,643 B2 | 4/2015 | Gu et al. |
| 9,028,650 B2 | 5/2015 | Ehrhardt et al. |
| 9,034,145 B2 | 5/2015 | Castro et al. |
| 9,051,687 B2 | 6/2015 | Esser et al. |
| 9,145,646 B2 | 9/2015 | Benz et al. |
| 9,181,657 B2 | 11/2015 | Castro et al. |
| 9,328,462 B2 | 5/2016 | Chen et al. |
| 9,347,181 B2 | 5/2016 | Lu et al. |
| 9,388,533 B2 | 7/2016 | Krapsch et al. |
| 9,487,916 B2 * | 11/2016 | Zhao .................. D21H 17/375 |
| 9,506,195 B2 | 11/2016 | Chen et al. |
| 9,506,202 B2 | 11/2016 | Zhao et al. |
| 9,567,708 B2 | 2/2017 | Cheng et al. |
| 9,624,623 B2 | 4/2017 | St. John et al. |
| 2002/0059990 A1 | 5/2002 | Bush et al. |
| 2002/0062934 A1 | 5/2002 | Bush et al. |
| 2002/0088595 A1 | 7/2002 | Edwards et al. |
| 2002/0100564 A1 | 8/2002 | Harvey et al. |
| 2003/0041990 A1 | 3/2003 | Munchow |
| 2003/0109617 A1 | 6/2003 | Niinikowski et al. |
| 2003/0188738 A1 | 10/2003 | Laleg |
| 2003/0188840 A1 | 10/2003 | Van Handel et al. |
| 2003/0224945 A1 | 12/2003 | Twu et al. |
| 2004/0060677 A1 | 4/2004 | Huang |
| 2004/0084162 A1 | 5/2004 | Shannon et al. |
| 2004/0221977 A1 | 11/2004 | Vergara Lopez |
| 2004/0247513 A1 | 12/2004 | Huhn, III |
| 2004/0250971 A1 | 12/2004 | Lopez |
| 2004/0250972 A1 | 12/2004 | Carr |
| 2005/0103455 A1 | 5/2005 | Edwards et al. |
| 2005/0155520 A1 | 7/2005 | Van Der Horst et al. |
| 2005/0155731 A1 | 7/2005 | Martin et al. |
| 2005/0161181 A1 | 7/2005 | St. John et al. |
| 2006/0037727 A1 | 2/2006 | Hagiopol et al. |
| 2006/0054291 A1 | 3/2006 | Dimmick et al. |
| 2006/0084771 A1 | 4/2006 | Wong Shing et al. |
| 2006/0084772 A1 | 4/2006 | Wong Shing et al. |
| 2006/0142535 A1 | 6/2006 | Cyr et al. |
| 2006/0162886 A1 | 7/2006 | Smith et al. |
| 2006/0201645 A1 | 9/2006 | Ito |
| 2006/0249269 A1 | 11/2006 | Kurian et al. |
| 2007/0000630 A1 | 1/2007 | Hassler et al. |
| 2008/0082198 A1 | 4/2008 | Gray et al. |
| 2008/0149287 A1 | 6/2008 | Hagiopol et al. |
| 2008/0196851 A1 | 8/2008 | Hund et al. |
| 2008/0277084 A1 | 11/2008 | Denowski et al. |
| 2008/0308242 A1 | 12/2008 | Lu et al. |
| 2009/0020250 A1 | 1/2009 | Kimura et al. |
| 2009/0025895 A1 | 1/2009 | Cowman |
| 2009/0065162 A1 | 3/2009 | Cheng et al. |
| 2009/0107644 A1 | 4/2009 | Cowman et al. |
| 2009/0145566 A1 | 6/2009 | Esser et al. |
| 2009/0162642 A1 | 6/2009 | Ono et al. |
| 2009/0165978 A1 | 7/2009 | Hagiopol et al. |
| 2009/0267258 A1 | 10/2009 | Cheng et al. |
| 2009/0281212 A1 | 11/2009 | Pawlowska et al. |
| 2009/0308553 A1 | 12/2009 | Souzy et al. |
| 2009/0312512 A1 | 12/2009 | Kurian et al. |
| 2010/0006243 A1 | 1/2010 | Duggirala et al. |
| 2010/0078138 A1 | 4/2010 | Laleg |
| 2010/0126684 A1 | 5/2010 | Cheng et al. |
| 2010/0155005 A1 | 6/2010 | Villa et al. |
| 2010/0186914 A1 | 7/2010 | Jehn-Rendu et al. |
| 2010/0193147 A1 | 8/2010 | Ryan et al. |
| 2010/0193148 A1 | 8/2010 | McKay et al. |
| 2010/0326614 A1 | 12/2010 | Hund et al. |
| 2011/0056640 A1 | 3/2011 | Cyr et al. |
| 2011/0067832 A1 | 3/2011 | Xia et al. |
| 2011/0083821 A1 | 4/2011 | Wright |
| 2011/0088861 A1 | 4/2011 | Cheng |
| 2011/0132559 A1 | 6/2011 | Haehnle et al. |
| 2011/0146925 A1 | 6/2011 | Bode et al. |
| 2011/0155339 A1 | 6/2011 | Brungardt et al. |
| 2011/0226433 A1 | 9/2011 | Cheng et al. |

(56) References Cited

U.S. PATENT DOCUMENTS

| | | |
|---|---|---|
| 2011/0244258 A1 | 10/2011 | Vonfelden |
| 2011/0290434 A1 | 12/2011 | Jehn-Rendu et al. |
| 2012/0035306 A1 | 2/2012 | Ryan et al. |
| 2012/0073773 A1 | 3/2012 | Jehn-Rendu et al. |
| 2012/0073774 A1 | 3/2012 | Jehn-Rendu et al. |
| 2012/0103546 A1 | 5/2012 | Maniere |
| 2012/0103547 A1 | 5/2012 | Grimm et al. |
| 2012/0103548 A1 | 5/2012 | Zhao et al. |
| 2012/0111517 A1 | 5/2012 | Borkar et al. |
| 2012/0135907 A1 | 5/2012 | Duggirala et al. |
| 2012/0135908 A1 | 5/2012 | Duggirala et al. |
| 2012/0186764 A1 | 7/2012 | McKay |
| 2012/0199304 A1 | 8/2012 | Cheng et al. |
| 2013/0059949 A1 | 3/2013 | Cheng et al. |
| 2013/0081771 A1 | 4/2013 | Luo et al. |
| 2013/0133847 A1 | 5/2013 | Zhao et al. |
| 2013/0139985 A1 | 6/2013 | Wright |
| 2013/0160959 A1 | 6/2013 | Rosencrance et al. |
| 2013/0186583 A1 | 7/2013 | Xia et al. |
| 2013/0192782 A1 | 8/2013 | Benz et al. |
| 2013/0299110 A1 | 11/2013 | Zhao et al. |
| 2013/0306261 A1 | 11/2013 | Zhao et al. |
| 2014/0053996 A1 | 2/2014 | Esser et al. |
| 2014/0060763 A1 | 3/2014 | Bode et al. |
| 2014/0130994 A1 | 5/2014 | St. John et al. |
| 2014/0182799 A1 | 7/2014 | Castro et al. |
| 2014/0182800 A1 | 7/2014 | Castro et al. |
| 2014/0262091 A1 | 9/2014 | Lu et al. |
| 2014/0284011 A1 | 9/2014 | Krapsch et al. |
| 2014/0336314 A1 | 11/2014 | Benz et al. |
| 2015/0020988 A1 | 1/2015 | St. John et al. |
| 2015/0041088 A1 | 2/2015 | Castro et al. |
| 2015/0041089 A1 | 2/2015 | Castro et al. |
| 2015/0041092 A1 | 2/2015 | Hietaniemi et al. |
| 2015/0059998 A1 | 3/2015 | Zhao et al. |
| 2015/0136348 A1 | 5/2015 | Hund et al. |
| 2015/0167245 A1 | 6/2015 | Cheng et al. |
| 2015/0176206 A1 | 6/2015 | Chen et al. |
| 2015/0176286 A1 | 6/2015 | Suggate |
| 2015/0191875 A1 | 7/2015 | Esser et al. |
| 2015/0197893 A1 | 7/2015 | Cheng et al. |
| 2015/0204019 A1 | 7/2015 | Wright |
| 2015/0299961 A1 | 10/2015 | Borkar et al. |
| 2016/0010282 A1 | 1/2016 | Haufe et al. |
| 2016/0097160 A1 | 4/2016 | Castro et al. |
| 2016/0097161 A1 | 4/2016 | Benz et al. |
| 2016/0298297 A1 | 10/2016 | Borkar et al. |
| 2017/0037574 A1 | 2/2017 | Grimm et al. |
| 2017/0121909 A1 | 5/2017 | Cheng et al. |
| 2017/0254021 A1 | 9/2017 | Castro et al. |

FOREIGN PATENT DOCUMENTS

| | | | |
|---|---|---|---|
| CN | 101736656 A | | 6/2010 |
| CN | 101802304 A | | 8/2010 |
| DE | 4426620 A1 | | 2/1995 |
| DE | 4436317 A1 | | 4/1996 |
| EP | 0025463 A1 | | 3/1981 |
| EP | 0050316 A1 | | 4/1982 |
| EP | 0151994 A2 | | 8/1985 |
| EP | 0261820 A1 | | 3/1988 |
| EP | 0278602 A1 | | 8/1988 |
| EP | 0361763 A2 | | 4/1990 |
| EP | 183466 B1 | | 8/1990 |
| EP | 0534656 A1 | | 3/1993 |
| EP | 657478 A2 | | 6/1995 |
| EP | 0805234 A2 | | 11/1997 |
| EP | 630909 B1 | | 10/1998 |
| EP | 1195259 A2 | | 4/2002 |
| EP | 1448850 A2 | | 8/2004 |
| EP | 1734174 A2 | | 12/2006 |
| EP | 1579071 B1 | | 7/2008 |
| EP | 2463020 A2 | | 6/2012 |
| GB | 2016498 A | | 9/1979 |
| GB | 2339208 A | | 1/2000 |
| JP | 1979(S54)-002411 A | | 1/1979 |
| JP | 61063796 | | 9/1984 |
| JP | 1993(H05)-239796 A | | 9/1993 |
| JP | H 06-299494 A | | 10/1994 |
| JP | 10-060794 | | 3/1998 |
| JP | 2004-100119 A | | 4/2004 |
| JP | 2005-001197 A | | 1/2005 |
| JP | 2005-194651 A | | 7/2005 |
| JP | 2005-273048 A | | 10/2005 |
| JP | 2007-154349 A | | 6/2007 |
| JP | 2008-049688 A | | 3/2008 |
| JP | 2008-255496 A | | 10/2008 |
| JP | 2012-107356 A | | 6/2012 |
| JP | 2012-525511 A | | 10/2012 |
| JP | 05247883 B2 | | 7/2013 |
| KR | 10-2009-0132577 A | | 12/2009 |
| WO | WO 95/21298 | | 8/1995 |
| WO | WO 1997/05330 A1 | | 2/1997 |
| WO | WO 1997/10387 A1 | | 3/1997 |
| WO | WO 97/44519 | | 11/1997 |
| WO | WO 97/46591 | | 12/1997 |
| WO | WO 99/05361 | | 2/1999 |
| WO | WO 99/60209 | | 11/1999 |
| WO | WO 00/15906 A1 | | 3/2000 |
| WO | WO 2000/11053 A1 | | 3/2000 |
| WO | WO 00/59965 | | 10/2000 |
| WO | WO 01/14274 A1 | | 3/2001 |
| WO | WO 03/033815 A2 | | 4/2003 |
| WO | WO 2004/061235 A1 | | 7/2004 |
| WO | WO 2004/072376 A1 | | 8/2004 |
| WO | WO 2004/098782 A1 | | 11/2004 |
| WO | WO 2006/044117 A2 | | 4/2006 |
| WO | WO 2006/068964 A2 | | 6/2006 |
| WO | WO 2007/050964 A1 | | 5/2007 |
| WO | WO 2008/028865 A2 | | 3/2008 |
| WO | WO 2009/059725 A2 | | 5/2009 |
| WO | WO 2010/088473 A1 | | 8/2010 |
| WO | WO 2010/126712 A1 | | 11/2010 |
| WO | WO 2011/116253 A2 | | 9/2011 |
| WO | WO 2012/007364 A1 | | 1/2012 |
| WO | WO 2012/061305 A1 | | 5/2012 |
| WO | WO 2012/100156 A1 | | 7/2012 |
| WO | WO 2012/125235 A2 | | 9/2012 |
| WO | WO 2013/078133 A1 | | 5/2013 |
| WO | WO 2013/192082 A1 | | 12/2013 |
| WO | WO 2014/073145 A1 | | 5/2014 |
| WO | WO 2014/078102 A1 | | 5/2014 |

OTHER PUBLICATIONS

Declaration of Weigoo Cheng under rule 1.132 filed in parent case U.S. Appl. No. 13/919,167 dated Aug. 27, 2015. (Year: 2015).*

NALCO FillerTEK™ Treatment Technology Installation & Operating Manual—OM0284, p. 9, Subsection 2.3.1 Mixer Specifications. (Year: 2015).*

Declaration of Weigoo Cheng under rule 1.132 filed in parent case U.S. Appl. No. 13/919,167 dated Dec. 4, 2015. (Year: 2015).*

Applicant's Remarks submitted Jun. 12, 2015 in parent case U.S. Appl. No. 13/919,167 in response to the Office Action dated Jan. 14, 2015. (Year: 2015).*

Alfano, Joseph C., Phillip W. Carter, and Alessandra Gerli, Nalco Chemical Company, USA. "Characterization of the flocculation dynamics in a papermaking system by non-imaging reflectance scanning laser microscopy (SLM)," Nordic Pulp and Paper Research Journal, 1998. vol. 13 (2), pp. 159-165.

Bobu, Elena, Emanuel Poppel, and Oana Petreus. "Preflocculated Calcium Carbonate for Filling Paper." Cellulose Chemistry and Technology, 1986. vol. 20, pp. 559-566.

FillerTEK™ Treatment Technology Installation & Operating Manual—OM0284, NALCO, Rev. 1.0, Feb. 2015, p. 9.

Flory, Paul J. "Determination of Molecular Weights." Cornell University Press, Ithaca, NY: *Principles of Polymer Chemistry*, Chapter VII, 1983, pp. 266-316.

Krentz, Dirk-Oliver. "Untersuchung des Flockungsverhaltens von Polyelektrolyten an technischen Truben und Modellsuspensionen," Dissertation, 2001, 225 pages.

(56) References Cited

OTHER PUBLICATIONS

Kuboshima, Katsumi. "On Functional Fillers for Paper Making (I) Highly Filler-Containing Paper," Institute of Pulp and Paper Industry, Shizuoka Prefecture No. 3363, Shizuoka, JP, pp. 31-38.

Mabee, Stuart W. "Controlled Filler Preflocculation—Improved Formation, Strength and Machine Performance." TAPPI Papermakers Conference, 2001, 8 pages.

Nystrom, Roger, Kaja Backfold, Jarl B. Rosenholm, and Kari Nurmi. "The Effect of Pretreatment of Calcite Dispersions with Anionic Sodium Polyacrylate on their Flocculation Behavior Induced by Cationic Starch," Journal of Colloid and Interface Science, 2003. vol. 262, pp. 48-54.

Ono, Hiroshi and Yulin Deng. "Cationic Microparticle Retention Aids: The Mechanism Study and Laboratory Evaluation," IPST Technical Paper Series 632. Institute of Paper Science and Technology, Atlanta, GA, 1997, 22 pages.

Ono, Hiroshi and Yulin Deng. "Flocculation and Retention of Precipitated Calcium Carbonate by Cationic Polymeric Microparticle Flocculants," Journal of Colloid and Interface Science, 1997. vol. 188, pp. 183-192.

Petzold, G., M. Mende, K. Lunkwitz, S. Schwarz, H.-M. Buchhammer. "Higher efficiency in the flocculation of clay suspensions by using combinations of oppositely charged polyelectrolytes," Colloids and Surfaces A: Physicochemical and Engineering Aspects, 2003. vol. 218, pp. 47-57.

Seppanen, Rauni and G. Strom. "Microfloc Formation of Fillers," Paper presented at $32^{nd}$ EUCEPA International Symposium: Additives Pigments and fillers in the Pulp & Paper Industry, Oct. 1990, Barcelona, ES, 14 pages.

Smook, Gary A. *Handbook for Pulp & Paper Technologists*, Second Edition. Vancouver, BC: Angus Wilde Publications, 1992, p. 220.

Yan, Zegui, Quijuan Liu, Yulin Deng, and Arthur Ragauskas. "Improvement of Paper Strength with Starch Modified Clay," Journal of Applied Polymer Science, 2005. vol. 97, pp. 44-50.

Yoon, Se-Young and Yulin Deng. "Flocculation and reflocculation of clay suspension by different polymer systems under turbulent conditions," Journal of Colloid and Interface Science, 2004, pp. 139-145.

Extended European Search Report from corresponding EP App. No. 13850762.9, dated May 27, 2016 (8 pages).

"Aego™ Sizer F—The PMT Film Size Press: How to improve paper strength properties, surface and machine runnability," TAPPSA Journal, 5:38-40 (2013).

Au, C.O., et al., "Applications of Wet-end Paper Chemistry," Blackie Academic and Professional an Imprint of Chapman Hall, pp. 76-90 (1975).

Biricik, et al., "Effects of Surface Sizing with Starch on Physical Strength Properties of Paper," Asian Journal of Chemistry, 23(7):3151-3154 (2011).

Extended European Search Report for EP App. No. 13855150.2, dated Jun. 15, 2016, 12 pages.

Farley, C.E. "Glyoxalated Polyacrylamide Resin," Wet-Strength Resins and Their Application, Chapter 3. Atlanta, GA: TAPPI Press, 1994, pp. 45-61.

Farley, C.E. and R.B. Wasser. "Sizing with Alkenyl Succinic Anhydride," The Sizing of Paper, 2nd Ed. Atlanta, GA: TAPPI Press, 1989, pp. 51-62.

Friberg, S.E. and S. Jones. "Emulsions," Encyclopedia of Chemical Technology, 4th Ed. vol. 9. Published Online Dec. 4, 2000, pp. 393-413.

Hercobond Product Analysis (2002), Nalco Chemical Company, one page.

Hunkeler et al. "Mechanism, Kinetics and Modeling of Inverse-Microsuspension Polymerization: 2. Copolymerizaton of Acrylamide with Quaternary Ammonium Cationic Monomers," Polymer. vol. 32, No. 14, 1991, pp. 2626-2640.

Hunkeler, et al. "Mechanism, Kinetics and Modeling of the Inverse-Microsuspension Homopolymerization of Acrylamide," Polymer. vol. 30, No. 1, 1989, pp. 127-142.

International Search Report and Written Opinion for International Application No. PCT/US2017/029069, 13 pages (dated Jul. 30, 2017).

International Search Report and Written Opinion for International Application No. PCT/US2015/054064, 13 pages (dated Nov. 30, 2015).

International Search Report and Written Opinion for International Application No. PCT/US2015/054069, 13 pages (dated Jan. 22, 2016).

International Search Report for International Application No. PCT/US2013/075377, 10 pages (dated Apr. 15, 2014).

International Search Report for International Application No. PCT/US2011/028917, 4 pages (dated Dec. 13, 2011).

Jenkins, "The use of alkenyl succinic anhydride for sizing recycled fibres," *TAPPSA Journal*, Nov. 2001.

Nie, Xun-zai, "Papermaking Process," China Light Industry Press, p. 65, 6 pages, with English Abstract (1999).

Parez Product Analysis (1999), Nalco Chemical Company, 20 pages.

St. John, M.R., "Ondeo-Nalco Technical Exchange." Jun. 27, 2002, 5 pages.

\* cited by examiner

METHOD OF IMPROVING DEWATERING EFFICIENCY, INCREASING SHEET WET WEB STRENGTH, INCREASING SHEET WET STRENGTH AND ENHANCING FILLER RETENTION IN PAPERMAKING

BACKGROUND

Typically in a papermaking process, chemicals are added in the wet end to assist in the dewatering of the slurry, increasing retention and improving wet or dry sheet strength. The wet end of the papermaking process refers to the stage in the papermaking process where the fiber is dispersed in the water in the slurry form. The fiber-water slurry then go through drainage and dewatering process to form a wet web. The solid content after this wet formation process is about 50%. The wet web is further dried and forms a dry sheet of paper mat. Paper mat comprises water and solids and is commonly 4 to 8% water. The solid portion of the paper mat includes fibers (typically cellulose based fibers) and can also include filler.

Fillers are mineral particles that are added to paper mat during the papermaking process to enhance the resulting paper's opacity and light reflecting properties. Some examples of fillers are described in U.S. Pat. No. 7,211,608. Fillers include inorganic and organic particle or pigments used to increase the opacity or brightness, reduce the porosity, or reduce the cost of the paper or paperboard sheet. Some examples of fillers include one or more of: kaolin clay, talc, titanium dioxide, alumina trihydrate, barium sulfate, magnesium hydroxide, pigments such as calcium carbonate, and the like.

Calcium carbonate filler comes in two forms, GCC (ground calcium carbonate) and PCC (precipitated calcium carbonate). GCC is naturally occurring calcium carbonate rock and PCC is synthetically produced calcium carbonate. Because it has a greater specific surface area, PCC has greater light scattering abilities and provides better optical properties to the resulting paper. For the same reason however, PCC filled paper mat produces paper which is weaker than GCC filled paper in dry strength, wet strength and wet web strength.

Filler is generally much smaller than fiber, therefore, filler has much larger specific surface area than fiber. One of the challenges people found to increase filler content in the sheet is that high filler content decreases the efficiency of wet end chemicals, such as dewatering aids, wet web strength aids and wet strength aids. This invention is to provide novel filler pretreatment, so that it reduced the adsorption of wet end chemicals onto filler surface, therefore, increased the efficiency of wet end chemicals such as dewatering aids, wet web strength aids and wet strength aids.

Paper wet web strength is very critical for paper producers because increased paper wet web strength would increase machine runnability and reduce sheet breaks and machine down time. Paper wet web strength is a function of the number and the strength of the bonds formed between interweaved fibers of the paper mat. Filler particles with greater surface area are more likely to become engaged to those fibers and interfere with the number and strength of those bonds. Because of its greater surface area, PCC filler interferes with those bonds more than GCC.

Paper dewatering efficiency is also very critical for paper producers because decreased dewatering efficiency in wet wed would increase steam demand for drying operation, reduce machine speed and production efficiency. Dewatering aids are widely used to improve dewatering efficiency for reducing energy consumption, increasing machine speed and production efficiency.

BRIEF SUMMARY

At least one embodiment of the disclosure is directed towards a method of papermaking comprising filler, the method comprising the steps of: providing a blend of filler particles, at least one drainage additive or wet web strength additive or wet strength aid, and cellulose fiber stock, treating the filler particles with a composition of matter in the absence of cellulose fiber stock, combining the filler particles with the cellulose fiber stock, treating the combination with at least one wet strength aid or wet web strength additive or drainage additive, and forming a paper mat from the combination, wherein at least 10% of the filler particles are precipitated calcium carbonate and at least 10% of the filler particles are ground calcium carbonate, the cellulose fiber stock comprises a plurality of cellulose fibers and water, and the composition of matter enhances the performance of the wet strength aid or wet web strength additive or drainage additive in the paper mat, wherein at least some of the composition of matter is added to the filler with a rotating admixing apparatus, the apparatus having a distribution head, which is rotated by a drive, is arranged in a container containing a slurry of the filler particles, and is associated with a rotational plane, and the distribution head has, along a circumference thereof, which surrounds a rotational axis, distributed outlets from which the composition is passed into the slurry and mixing blades, characterized in that the outlets are formed as openings and the mixing blades are formed as strips extending transverse to the rotational plane and having a length equal at least half of an inner diameter of the slurry pipe; and delivering the composition to the distribution head for admixing the composition to the filler slurry.

Another aspect of the present disclosure is directed to a method of papermaking. The method comprises treating filler particles in a container with a composition of matter, in the absence of a cellulose fiber stock, by contacting the filler particles in the container with a rotating admixing apparatus having a distribution head, wherein the filler particles are selected from precipitated calcium carbonate, ground calcium carbonate, and any combination thereof. The method also includes the steps of combining the treated filler particles with the cellulose fiber stock thereby forming a combination, wherein the cellulose fiber stock comprises a plurality of cellulose fibers and water, and treating at least one of the cellulose fiber stock and the combination with a member selected from the group consisting of a wet strength aid, a wet web strength additive, a drainage additive, and any combination thereof. The method additionally includes the step of forming a paper mat, wherein the distribution head is rotated by a drive, arranged in the container containing the filler particles, and associated with a rotational plane, the distribution head having, along a circumference thereof, which surrounds a rotational axis, distributed outlets from which the composition is passed into the container, the outlets comprising openings and the container comprising mixing blades extending transverse to the rotational plane and having a length equal to at least half of an inner diameter of the container.

Additional features and advantages are described herein, and will be apparent from, the following description.

BRIEF DESCRIPTION OF THE DRAWINGS

A detailed description follows with specific reference being made to the drawings in which.

For the purposes of this disclosure, like reference numerals in the figures shall refer to like features unless otherwise indicated. The drawings are only an exemplification of the principles of the invention and are not intended to limit the invention to the particular embodiments illustrated.

DETAILED DESCRIPTION

Figure 1:
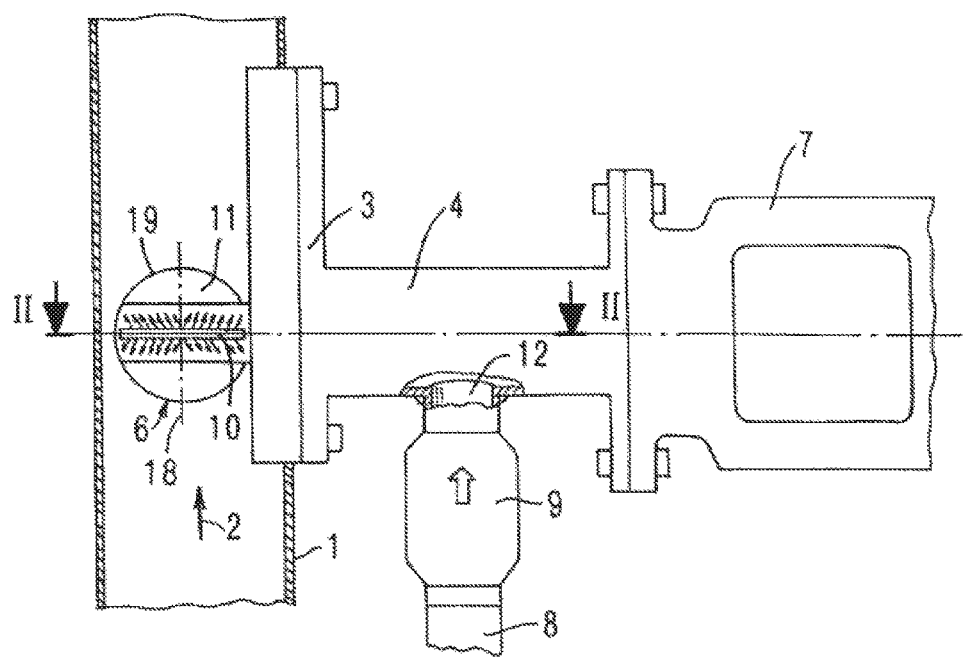
FIG. 1 is an cross sectional illustration of a device used to feed the invention to a slurry of filler particles.

At least one embodiment of the disclosure relates to a method of making paper which comprises filler. In at least one embodiment, the method comprises: creating a filler blend of PCC and GCC in which PCC comprises at least 10% by mass of the filler and GCC comprises at least 10% of the filler mass, pre-treating at least some of the filler particles with a coating that decreases the adhesion between a wet web strength additive or drainage aid or wet strength aid and the filler particles, and adding both the filler blend and the wet web strength additive or drainage aid or wet strength aid to the paper mat.

It has been known for some time that adding wet web strength additives or drainage aid or wet strength aid to paper mat increases the wet web strength of the resulting paper or enhances drainage or improves machine speed and runnability or enhance sheet wet strength. Some examples of wet strength aids, wet web strength additives and drainage aids are described in U.S. Pat. Nos. 7,125,469, 7,615,135 and 7,641,776, all of which are incorporated by reference into the present application in their entirety.

Unfortunately it is not practical to add large amounts of wet strength aids or wet web strength additives or drainage aids to compensate for the weakness due to large amounts of filler in paper mat. One reason is because those additives are expensive and using large amounts of additives would result in production costs that are commercially non-viable. In addition, adding too much additive negatively affects the process of papermaking and inhibits the operability of various forms of papermaking equipment. Furthermore cellulose fibers can only adsorb a limited amount of wet strength aid or wet web strength additive or drainage aid. This imposes a limit on how much additive can be used. One reason why this is so is because wet strength aid or wet web strength additive or drainage aid tend to neutralize the anionic fiber/filler charges and when these charges are neutralized further adsorption of those additives is inhibited.

Adding filler to the paper mat also reduces the effectiveness of the wet strength aid or wet web strength additive or drainage aid. Those additives have a tendency to coat the filler particles. The more filler particles present, the more additive coats the filler particles, and therefore there is less wet strength aid or wet web strength additive or drainage available to bind the cellulose fibers together. Because there is a maximum amount of wet strength aid or wet web strength additive or drainage that can be added, more filler has always meant less effective strength additive. This effect is more acute with PCC than GCC because PCC's higher surface area becomes more coated with the additives than GCC.

In at least one embodiment of the disclosure at least some of the filler particles are pre-treated with a composition of matter to at least partially prevent the adherence of wet strength aid or wet web strength additive or drainage aid to the filler particles. The pre-treatment contemplates entirely coating some or all of one or more filler particles with the composition of matter. In the alternative, the pre-treatment contemplates applying the composition of matter to only a portion of one or more of the filler particles, or completely coating some filler particles and applying the composition of matter to only a portion of some other particles. In at least one embodiment the pre-treatment is performed with at least some of the compositions of matter described in U.S. Pat. No. 5,221,435, which is incorporated into the present application in its entirety, and in particular the cationic charge-biasing species described therein. In at least one embodiment the pre-treatment is performed with a diallyl-N,N-disubstituted ammonium halide-acrylamide copolymer as described in U.S. Pat. No. 6,592,718, which is incorporated into the present application in its entirety.

While pre-treating filler particles is known in the art, prior art methods of pre-treating filler particles are not directed towards affecting the adhesion of the wet strength aid or wet web strength additive or drainage aid to the filler particles. In fact, many prior art pre-treatments increase the adhesion of the strength additive to the filler particles. For example, U.S. Pat. No. 7,211,608 describes a method of pre-treating filler particles with hydrophobic polymers. This pre-treatment however does nothing to the adhesion between the strength additive and the filler particles and merely repels water to counterbalance an excess of water absorbed by the strength additive. In contrast, the invention decreases the interactions between the wet strength aid or wet web strength additive or drainage aid and the filler particles and results in an unexpectedly huge increase in paper strength, sheet dewatering and machine runnability.

When comparing wet tensile strength of a given paper versus the percentage of filler relative to the total solid portion of the paper mat used to produce the given paper, the results clearly illustrates that sheet had very weak wet strength without addition of wet strength aid 63700 (temporary wet strength aid). Velox could significantly increase sheet wet strength. Filler pretreatment alone did not increase sheet wet strength. However, filler pretreatment further enhance Velox performance which resulted in higher sheet wet strength.

When comparing wet web tensile strength of a given paper versus the percentage of filler relative to the total solid portion of the paper mat used to produce the given paper, the relationship between increasing filler content and decreasing paper wet web strength is a linear relationship. Without the addition of Nalco dewatering aid (wet web strength aid) 63700, paper sheet had very poor wet web strength. Sheet wet web strength could be significantly improved by the using of Nalco dewatering aid 63700. Filler pretreatment alone had negligible effect on paper wet web strength. However, filler pretreatment could further boost the performance of Nalco dewatering aid 63700, and additional 20% wet strength improvement was achieved by the filler pre-treatment at the lower ash content. As for the higher ash content, the performance of 63700 was boosted even higher than 20%. This is because the reduced effectiveness of the strength additive trapped against the filler particles was released by the filler pretreatment.

At least some of the fillers encompassed by this invention are well known and commercially available. They include any inorganic or organic particle or pigment used to increase the opacity or brightness, reduce the porosity, or reduce the cost of the paper or paperboard sheet. The most common fillers are calcium carbonate and clay. However, talc, titanium dioxide, alumina trihydrate, barium sulfate, and magnesium hydroxide are also suitable fillers. Calcium carbonate includes ground calcium carbonate (GCC) in a dry or dispersed slurry form, chalk, precipitated calcium carbonate (PCC) of any morphology, and precipitated calcium carbonate in a dispersed slurry form. The dispersed slurry forms of GCC or PCC are typically produced using polyacrylic acid polymer dispersants or sodium polyphosphate dispersants. Each of these dispersants imparts a significant anionic charge to the calcium carbonate particles. Kaolin clay slurries also are dispersed using polyacrylic acid polymers or sodium polyphosphate.

In at least one embodiment, the treating composition of matter is any one of or combination of the compositions of matter described in U.S. Pat. No. 6,592,718, which is incorporated into the present application in its entirety. In particular, any of the AcAm/DADMAC copolymer compositions described in detail therein are suitable as the treating composition of matter. An example of an AcAm/DADMAC copolymer composition is product# Nalco-4690 from Nalco Company of Naperville, Ill. (hereinafter referred to as 4690).

The treating composition of matter can be a coagulant. The coagulants encompassed in this invention are well known and commercially available. They may be inorganic or organic. Representative inorganic coagulants include alum, sodium aluminate, polyaluminum chlorides or PACs (which are also known as aluminum chlorohydroxide, aluminum hydroxide chloride, and polyaluminum hydroxychloride), sulfated polyaluminum chlorides, polyaluminum silica sulfate, ferric sulfate, ferric chloride, and the like and blends thereof.

Some organic coagulants suitable as a treating composition of matter are formed by condensation polymerization. Examples of polymers of this type include epichlorohydrin-dimethylamine (EPI-DMA), and EPI-DMA ammonia cross-linked polymers.

Additional coagulants suitable as a treating composition of matter include polymers of ethylene dichloride and ammonia, or ethylene dichloride and dimethylamine, with or without the addition of ammonia, condensation polymers of multifunctional amines such as diethylenetriamine, tetraethylenepentamine, hexamethylenediamine and the like with ethylenedichloride and polymers made by condensation reactions such as melamine formaldehyde resins.

Additional coagulants suitable as a treating composition of matter include cationically charged vinyl addition polymers such as polymers, copolymers, and terpolymers of (meth)acrylamide, diallyl-N,N-disubstituted ammonium halide, dimethylaminoethyl methacrylate and its quaternary ammonium salts, dimethylaminoethyl acrylate and its quaternary ammonium salts, methacrylamidopropyltrimethylammonium chloride, diallylmethyl(beta-propionamido)ammonium chloride, (beta-methacryloyloxyethyl)trimethyl ammonium methylsulfate, quaternized polyvinyllactam, vinylamine, and acrylamide or methacrylamide that has been reacted to produce the Mannich or quaternary Mannich derivatives. Preferable quaternary ammonium salts may be produced using methyl chloride, dimethyl sulfate, or benzyl chloride. The terpolymers may include anionic monomers such as acrylic acid or 2-acrylamido 2-methylpropane sulfonic acid as long as the overall charge on the polymer is cationic. The molecular weights of these polymers, both vinyl addition and condensation, range from as low as several hundred to as high as several million. Preferably, the molecular weight range should be from about 20,000 to about 1,000,000. In at least one embodiment, the pre-treatment is preformed by a combination of one, some, or all of any of the compositions of matter described as suitable compositions of matter for pre-treating the filler particles.

In at least one embodiment, the wet strength aid or wet web strength additive or drainage aids carries the same charge as the composition of matter suitable for treating the filler particles. When the two carry the same charge, the filler additive is less likely to adsorb wet strength aid, wet web strength additive or drainage aid on its surface. Wet strength aids, wet web strength additives or drainage aids encompassed by the invention include any one of the compositions of matter described in U.S. Pat. No. 4,605,702 and U.S. Patent Application Publication No. 2005/0161181, the disclosures of which are incorporated into the present application in their entirety, and in particular the various glyoxylated Acrylamide/DADMAC copolymer compositions described therein. An example of a glyoxylated Acrylamide/DADMAC copolymer composition is product# Nalco 63700 (made by Nalco Company, Naperville, Ill.). Other examples include amine-containing polymers, such as allylamine/acrylamide copolymers and polyvinylamines, and an additional example is polyamide-polyamine-epichlorohydrin (PAE).

In at least one embodiment, the fillers used are PCC, GCC, and/or kaolin clay. In at least one embodiment, the fillers used are PCC, GCC, and/or kaolin clay with polyacrylic acid polymer dispersants or their blends. The ratio of wet strength additive or wet web strength aid or drainage additive relative to solid paper mat can be 3 kg of additive per ton of paper mat.

In at least one embodiment at least some of the filler particles are pre-treated using a rotating admixing apparatus. A rotating admixing apparatus comprises a distribution head which is constructed and arranged to rotate as it disperses the treating chemicals to the filler particles. In at least one embodiment the rotating admixing apparatus is the device described in U.S. Pat. No. 5,993,670, which is incorporated into the present application in its entirety. The apparatus can admix flocculant liquid(s) to a process stream, in which a distribution head, which is rotated by a drive, is arranged in a pipe/conduit, through which a slurry of filler particles flows, and is associated with a rotational plane, and the distribution head has, along a circumference thereof, which surrounds a rotational axis, distributed flocculant outlets and mixing blades, and is connected with a flocculant liquid delivery conduit.

In at least one embodiment the invention also relates to the use of the apparatus of admixing the flocculant liquid, which is formed by a mixture of an active agent and water and of which a particular amount is added to 100 parts of the filler slurry, with the flocculant liquid added to the 100 parts of the slurry containing a necessary amount a of the active agent.

There exist cases, when an apparatus for admixing is located, in the direction of the filler slurry flow, downstream of a delivery pump or a centrifuge and which mixes a flocculant liquid and the filler with each other with good results. However, there exists a noticeable number of cases when this is not the case and when the admixing apparatus fails to effect a satisfactory mixing of the flocculant liquid and the filler. In a known apparatus of the above-mentioned type (DE-05 40 29 824), the flocculant outlets are formed as holes or nozzles, and each mixing blade is formed as a journal-like projection, with the dimensions of the mixing blade and the outlet in a direction transverse to the rotational plane being very small in comparison with the width of the filler slurry stream. In some cases the admixture of the flocculant liquid to the slurry, which is obtained with this apparatus is insufficient, i.e., the added flocculant liquid is not sufficiently uniformly distributed in the slurry stream behind the apparatus and is not contained in the slurry in the quantity necessary for a satisfactory flocculation.

Therefore, an object of the disclosure is an apparatus of the above-described type with which a better admixing of the flocculant liquid to the slurry is achieved. The apparatus according to the invention, which achieves this object, is characterized in that the flocculant outlets are formed as slots and the mixing blades are formed as strips, which extend transverse to the rotational plane and have a length equal at least a half of the width of the slurry stream.

In at least one embodiment only one, some, or all of the chemicals added in the pre-treatment process are added with the rotating apparatus.

In at least one embodiment the construction of the distribution head of the apparatus permits to achieve an improved admixture and distribution of the flocculant liquid in the slurry. The flocculant liquid exits from every slot in a form of a broad strip into which a following mixing blade is inserted in a direction opposite to the rotational direction and which pulls the flocculant liquid along its edge as a foggy strip through the slurry. The flocculant liquid is delivered through the slots as an interrupted torrent into the slurry, and the slots and strips are arranged one after another in the rotational direction. The dimensioning of the length of the slots and the blades is effected in accordance with the diameter of the stream or of the distribution head.

In at least one embodiment, the flocculant slots and the strip-shaped blades can extend both in the direction of the slurry stream and substantially perpendicular to the slurry stream. In some embodiments, the rotational axis of the mixing head extends at an angle to the slurry stream. The rotational plane of the mixing head may extend substantially in the direction of the slurry stream.

Each slot is formed, e.g., of two or more slot sections arranged in a row. It is, however, particularly effective and advantageous when each slot is continuous along its entire length. This prevents clogging and an undesirable high exit velocity of the flocculant liquid.

Each strip-shaped mixing blade is divided, e.g., along its length, with radial incisions in a comb-like fashion. However, if is particularly effective and advantageous when each strip-shaped mixing blade is continuous over its length. This improves the rigidity of the strip-shaped mixing blades and improves the mixing action.

The cross-section of each outlet slot can be changed along its length for controlling the amount of the emerging flocculant liquid. It is particular effective and advantageous when the cross-section of each outlet slot is increased, when viewed along its length, toward the middle. This shape of the outlet slots is used when the slots extend transverse to the stream direction, as in the middle of the slurry pipe, there is more slurry than at the sides. With a uniform slot width, a uniform delivery of the flocculant into the slurry is achieved.

In at least one embodiment the slots, which form an outlet for the flocculant liquid, have, e.g., a width of 7-9 mm. The greater is the amount of the flocculant liquid to be delivered in a unit of time, the wider the slots are, and the smaller is the amount of the flocculant liquid to be delivered in a unit of time, the narrower they are.

It is particularly effective and advantageous when the edge of each strip-shaped mixing blade extend approximately parallel to the inner contour of the slurry pipe, forming a clearance therebetween. The elongate strip-shaped mixing blades extending in a radial direction improve the admixing action. However, a clearance should remain between the mixing blade and the slurry conduit, with the clearance being sufficiently large to permit passing of stone pieces present in the slurry.

This clearance is particularly important and is large when the strip-shaped mixing blades extend transverse to the stream. When the strip-shaped mixing blades extend transverse to the stream, the clearance preferably is smaller in the direction of the rotational axis than in the direction transverse to the rotational axis.

A particularly effective and advantageous embodiment is obtained when the direction of rotation of the distribution head drive can be changed. In the apparatus according to the disclosure, the mixing blade is relatively large or protrudes with respect to the slurry pipe cross-section, so that a danger of clogging with hard pieces and of accumulation of fibers or threads exists if the distribution head rotates in the same direction for a long time. The rotation in opposite directions prevents such clogging and accumulation.

One, two, and/or more flocculant outlets can be provided, e.g., between two mixing blades. However, it is particularly effective and advantageous when outlet slots and strip-shaped mixing blades alternate in the rotational direction. This also improves the admixing process. Over the distribution head, in the rotational direction, there are provided two or more outlet slots and two or more strip-shaped mixing blades.

It is further particularly effective and advantageous when the inner cross-section of the slurry pipe, in the region of the distribution head, is similar to the further inner cross-section of the slurry pipe. The apparatus thus eliminates the narrowing of the slurry pipe and an associated increase of the flow velocity of the slurry. The distribution head already forms a greater narrowing of the cross-section available for the slurry.

It is particularly effective and advantageous when the distribution head is formed as a cylindrical tubular section and/or when the outer diameter of the distribution head is equal at least to 0.4 of the inner diameter of the slurry pipe. This simplifies the construction and improves the rigidity of the distribution head, with the shape of the outlet slots and the strip-shaped mixing blades presenting an increased demand to the rigidity of the distribution head.

A particularly effective and advantageous embodiment is formed when the distribution head passes into a rotatably supported connection tube which extends away from the slurry pipe and which is connected to the drive and with a flocculant liquid delivery conduit, and is further provided with inlet openings and is rotably supported in a connection chamber into which the flocculant liquid delivery conduit opens. This manner of delivery of the flocculant liquid to a rotatable distribution head permits to insure an increased rigidity of the connection tube and its support with simple means. This becomes possible in the to apparatus due to the "stone crushing" cooperation of the strip-shaped mixing blades and the slurry pipe.

For a satisfactory delivery of the flocculant liquid(s) through the outlet slots, the flow cross-section, which is available for the flocculant liquid(s), is very important. In one embodiment, all of the outlet slots together have a cross-section which is smaller than the preceding flow cross-section of the flocculant liquid. The entire cross-section of the inlet opening is not smaller than the flow cross-section in the delivery conduit and in the connection tube. The flow cross-section in the distribution head and in the connection tube are similar. The arrangement of the connection tube in a sealed connection chamber enables to optimize the flow cross-section of the flocculant liquid.

It is particularly effective and advantageous when a check valve is arranged in the flocculant liquid delivery conduit when the flocculant liquid in front of the check valve is not under pressure, e.g., when the flocculant liquid pump does not operate, the slurry can penetrate into the outlet slots. The sealings and the bearings in the connection chamber remain lubricated with the flocculant liquid when the flocculant liquid from the flocculant liquid pump is not under pressure any more.

A particular effective and advantageous embodiment of the invention is obtained when the distribution head is driven with a rotational speed of 700-2,500 revolution/min preferably, 1,000-2,000 revolution/min. At this relatively high rotational speed, a desired improved admixing and distribution of the flocculant liquid in the slurry takes place. At the too low rotational speed, below 500 revolution/min, the strip or the stream of the flocculant liquid break off. However, a big speed requires too high expenses in order to achieve the desired effect. In a known apparatus (DE-05 4029824) of the above-described type, the flocculant is available which is stored in a reservoir. It is further known (DE-05 39 01 292) to add fresh water to a flocculant available in a liquid or powder form to obtain about 1% of a flocculant parent solution. The flocculant parent solution is then mixed, at a filling station, with 4-10 volume parts of make-up water to obtain a flocculant in a form of a so-called commercial solution. This flocculant is added in the amount of 18-20% of the amount of the filler slurry is added to the slurry, i.e., about 20 parts of the flocculant liquid in a form of flocculant agent is added to 100 parts of filler particles. At that, the flocculant—containing slurry, i.e., the conditioned filler, contains ⅙ of liquid added by admixing of the additionally added flocculant liquid.

In a known application, for the additional processing of the flocculant agent a large amount of water is used, which is expensive. For processing, in addition to the apparatus for obtaining the parent solution, an apparatus for obtaining the commercial solution is needed, which results in additional expenses associated with the apparatus and in additional expenses associated with the driving of the apparatus. The flocculant and its water are delivered until they mix up with the slurry, and the delivery require energy, which is costly. The water component of the flocculant must be delivered, together with the slurry, to filter presses, pass through the filter presses and, finally, purified again. Thus, in a known application, additional increased expenses are associated with the water contained in the flocculant liquid.

Therefore, an object of the disclosure is to so improve the process described above that the expenses associated with the use of the flocculant liquid or increase of its water content, are eliminated. This object is achieved according to the invention by so designing the above-described apparatus according to the invention that maximum 3 t of the flocculant liquid need be provided for 100 t of filler slurry.

It was found out, that the use of the distribution head of the apparatus according to the invention permits to eliminate the water component of the flocculant liquid without the elimination of the effectiveness of the flocculant liquid admixed to the slurry. Whereas in the know application in order to achieve a predetermined effect with a predetermined amount of the additive, a large amount of the water component is necessary, this is not necessary when the inventive apparatus is used. The water component of the flocculant liquid can be reduced to a very large extent, so that the expenses associated with this water content are correspondingly eliminated. As less water is necessary, less water need be pumped, and less water need be purified.

The improved effectiveness achieved by the invention can be explained, without claiming that the explanation is correct, as follows: The particular shape of the mixing blade of the inventive apparatus breaks the filler slurry particles of the slurry to a great extent, and the resulting broken pieces form open fissures. The particular shape of the flocculant outlets insures that the flocculant liquid takes a shape of a large surface veil which cover the freshly opened fissures so that the mixing of the filler and the flocculant intensifies. The flocculant liquid in accordance with the invention is already admixed in a finely distributed state so that it is not necessary the additive to further dilute in a large amount of water, i.e., to increase the water component of the flocculant liquid. Thus, according to a particular effective and advantageous embodiment of the invention, the flocculant liquid is used as a parent solution, with the additive being mixed with water in a single step. With this embodiment, additional stations for further mixing with water are eliminated.

Figure 2:
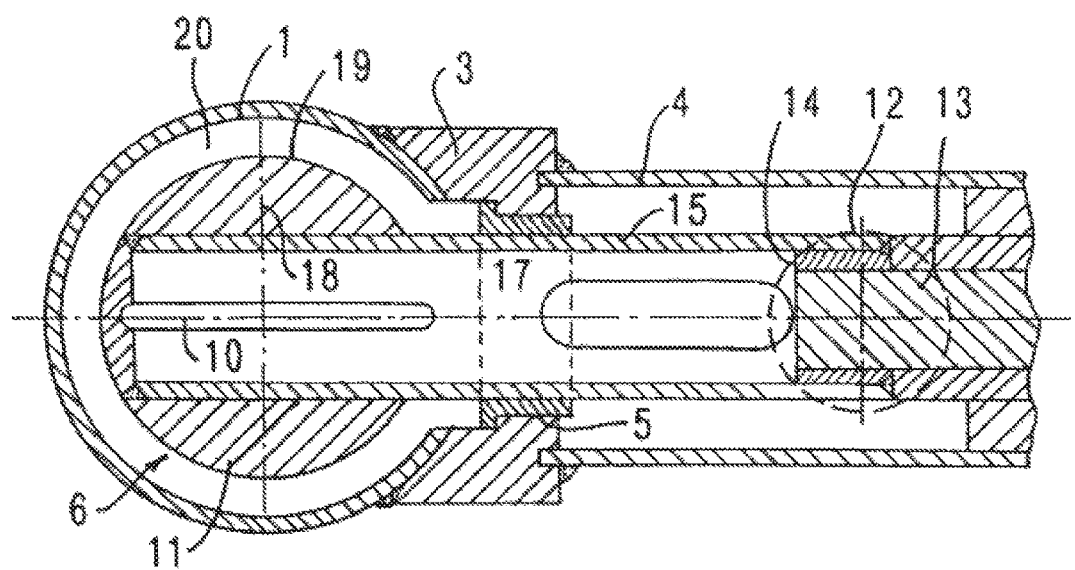
FIG. 2 is an exploded view of a cross sectional view of a device used to feed the invention to slurry of filler particles.

Referring now to FIGS. 1 and 2 it is shown in at least one embodiment that the apparatus may be mounted on a filler slurry carrying conduit/pipe 1 through which a filler slurry flows in a direction of arrow 2. The apparatus may be mounted on the slurry pipe 1 by means of an elongate flange 3 and includes a connection chamber 4 projecting from the flange 3. From the connection chamber 4, a distribution head 6 extends into the slurry pipe 1 and is rotated by a drive 7 provided at the opposite end of the chamber 4 and formed as an electromotor. A flocculant liquid conduit 8 opens into the chamber 4, and a check valve 9 is located in the conduit 8. The distribution head 6 forms outlet slots 10 and carries mixing strip shaped blades (11).

A sleeve 14 supports a connection tube 15 in a shaft extension 12 which extends from the drive 7, and in the end wall of the connection chamber 4, there is provided an axial face seal 16 through which the shaft extension 13 extends. The connection tube 15 has a plurality of elongate entrance openings 17 through which flocculant flows into the connection tube from the connection chamber. The connection tube 15 projects into connection chamber 4 through a plain bearing sleeve 5 provided in the flange 3, with the tubular-shaped distribution head 6 forming an integral part of the tube 15. The distribution head 6 is associated with a rotational plane 18 designated with a dash line. Each mixing blade 11 forms an arcuate edge 19 which, in a corresponding position of the blade, limits a slot 20 with respect to the slurry pipe 1, which has a circular cross-section.

The foregoing may be better understood by reference to the following example, which is presented for purposes of illustration and is not intended to limit the scope of the invention.

Example 1

1(i) Filler Pre-Treatment:

A blend of filler particles was obtained from a paper mill. The blend filler was a mixture of 50% PCC and 50% GCC. The filler blend was diluted to 20% solid content with tap water. 200 mL of the diluted filler blend was placed in a 500 mL glass beaker. Stirring was conducted for at least 30 seconds prior to the addition of coagulant. The stirrer was a EUROSTAR Digital overhead mixer with a R1342, 50 mm, four-blade propeller (both from IKA Works, Inc., Wilmington, N.C.). A coagulant solution was slowly added after the initial 30 seconds of mixing under stirring with 800 rpm. The coagulant solution used was 4690. The dose of coagulant was 1 kg/ton based on dry filler weight. Stirring continued at 800 rpm until all the coagulant was added. Then the stirring speed increased to 1500 rpm for one minute.

1(ii) Use of Filler:

Furnish was prepared by disintegrating commercial bleached hardwood dry lap. The mixture of 50% PCC and 50% GCC was added to pulp furnish to achieve different filler content in the sheet.

200 ppm Nalco 61067 was used as retention aid. For the pretreatment evaluation, filler mixture was pretreated using Nalco coagulant 4690 before filler was added into the furnish. During the handsheet preparation, 3 kg/ton Nalco 63700 was added to improve the sheet wet web strength. We tried to evaluate the effect of filler pretreatment on the press dewatering performance of 63700 by measuring sheet wet web strength. Handsheets were pressed to a certain solid content (50%) by controlling the same pressure level at 60 degree C., and the time required to completely break up wet sheet in water under the shear force of 1000 RPM was recorded to compare sheet wet web strength, which was expected to indirectly reflect press dewatering. The results indicate that sheet wet web strength could be significantly improved by the addition of 63700. Filler pretreatment could further boost sheet wet web strength by additional 20% at the lower ash content. As for the higher ash content, the performance of 63700 was even higher than 20%.

Example 2

A machine trial was run in which a papermaking machine made GAB300 with machine speed of 900 m/min. A composition was provided whose cellulose fibers were 14% MW; 3% coated broke; 17% SOW; 12% Uncoated Broke, 44% DIP and 10% ONP. The furnish also contained GCC. During the trial, all the wet end additives including 15/ton Nalco press dewatering aid 63700, retention aids, sizing agents, and cationic starches were kept constant.

1) Filler Retention Enhancement:

4690 was gradually increased from 0.5 kg/ton to 2 kg/ton based on filler. It was found that online ash content was increased gradually with the addition of 4690 to the filler pipe. Obviously, 0.7 ash point increase from 15.6% to 16.3% was obtained through filler pre-treatment. Historically, for the same grade production, recorded ash content of DCS was about 12% without using Nalco 63700. It should be pointed out that the ash content improvement was only contributed by filler ply. Therefore, ash content increase in filler ply was supposed to be about 1.4% because filler ply accounted for half basis weight of the final product. FPAR was increased from 70% to 75%, which could explain why final ash content was significantly enhanced.

2) Steam Pressure Reduction:

It was also found that steam pressure of the pre-dryer was reduced through filler treatment. Steam pressure was gradually decreased from 2.15 to 2 bar from 10:30 am to 2:00 pm. Even though press pressure of the first press section and press pressure of the second press section were reduced from 550 to 470 and 600 to 580 respectively, the steam pressure only went back to 2.05.

During the trial, the ash content increased from around 15.6% to 16.3% about 1 hour after the filler was pretreated, then was kept at the same level for several hours. On the other hand, the steam pressure kept decreasing for several hours until the press load was reduced. This seems to indicate that the steam reduction was not only from ash content increase. Moreover, the steam demand reduction of this trial was only from filler ply since 4690 was only applied for this ply, thus the total steam reduction caused by ash content increase alone should be less. Therefore, the results illustrated that filler pre-treatment could enhance 63700 performance as press dewatering agent or wet web strength aid.

A person of ordinary skill in the art will recognize that all of the previously described methods are also applicable to paper mat comprising other non-cellulose based fibrous materials, paper mats comprising a mixture of cellulose based and non-cellulose based fibrous materials, and/or synthetic fibrous based materials.

Changes can be made in the composition, operation, and arrangement of the method of the invention described herein without departing from the concept and scope of the invention as defined in the claims. While this invention may be embodied in many different forms, there are described in detail herein specific preferred embodiments of the invention. The present disclosure is an exemplification of the principles of the invention and is not intended to limit the invention to the particular embodiments illustrated. Furthermore, the invention encompasses any possible combination of some or all of the various embodiments described herein. All patents, patent applications, and other cited materials mentioned anywhere in this application or in any cited patent, cited patent application, or other cited material are hereby incorporated by reference in their entirety. Furthermore this invention contemplates embodiments which exclude one, some, or all of the compositions, methods, components, elements, or other portions of any cited material.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of papermaking, comprising:
   treating filler particles in a container with a composition of matter, in the absence of a cellulose fiber stock, by contacting the filler particles in the container with a rotating admixing apparatus having a distribution head rotating at a rotational speed of 1800 to 3000 rpm while the filler particles and the composition of matter are in the container, wherein the filler particles are selected from precipitated calcium carbonate, ground calcium carbonate, an organic pigment, an inorganic pigment, clay, talc, titanium dioxide, alumina trihydrate, barium sulfate, magnesium hydroxide, and any combination thereof;
   combining the treated filler particles with the cellulose fiber stock thereby forming a filler and fiber stock combination, wherein the cellulose fiber stock comprises a plurality of cellulose fibers and water;
   treating at least one of the cellulose fiber stock and the filler and fiber stock combination with a member selected from the group consisting of a wet strength aid, a wet web strength additive, a drainage additive, and any combination thereof; and
   forming a paper mat;

wherein the distribution head is rotated by a drive, arranged in the container containing the filler particles, and associated with a rotational plane, the distribution head having, along a circumference thereof, which surrounds the rotational axis, distributed outlets from which the composition is passed into the container, the outlets comprising openings and the distribution head comprising mixing blades extending transverse to the rotational plane and having a length equal to at least half of an inner diameter of the container.

2. The method of claim 1, wherein at least a portion of the precipitated calcium carbonate is in a form selected from the group consisting of undispersed calcium carbonate, dispersed slurry calcium carbonate, chalk, and any combination thereof.

3. The method of claim 1, wherein at least a portion of the precipitated calcium carbonate comprises a dispersed slurry, the dispersed slurry comprising a member selected from the group consisting of a polyacrylic acid polymer dispersant, a sodium polyphosphate dispersant, a kaolin clay slurry, and any combination thereof.

4. The method of claim 1, wherein the filler particles comprise 50% ground calcium carbonate and 50% precipitated calcium carbonate.

5. The method of claim 1, wherein the composition of matter is a coagulant.

6. The method of claim 5, wherein the coagulant is selected from the group consisting of an inorganic coagulant, an organic coagulant, a condensation polymerization coagulant, alum, sodium aluminate, a polyaluminum chloride, aluminum chlorohydroxide, aluminum hydroxide chloride, polyaluminum hydroxychloride, a sulfated polyaluminum chloride, polyaluminum silica sulfate, ferric sulfate, ferric chloride, epichlorohydrin-dimethylamine (EPI-DMA), an EPI-DMA ammonia crosslinked polymer, a polymer comprising ethylene dichloride, a dimethylamine polymer, a condensation polymer comprising diethylenetriamine, a condensation polymer comprising tetraethylenepentamine, a condensation polymer comprising hexamethylenediamine, a condensation polymer comprising ethylenedichloride, a melamine polymer, a formaldehyde resin polymer, a cationically charged vinyl addition polymer, and any combination thereof.

7. The method of claim 1, wherein the composition of matter is a polymer comprising diallyldimethylammonium chloride (DADMAC) and acrylamide.

8. The method of claim 1, wherein at least one of the drainage additive, the wet web strength additive, and the wet strength aid is selected from the group consisting of a glyoxylated acrylamide/DADMAC copolymer, a polyvinylamine, a polyvinylamide, a polydiallylamine, and any combination thereof.

9. The method of claim 1, wherein the filler particles comprise ground calcium carbonate.

10. The method of claim 1, wherein the filler particles exclude precipitated calcium carbonate.

11. The method of claim 1, wherein the paper mat comprises a solid portion, the solid portion comprising greater than 50% by weight of the filler particles.

12. The method of claim 1, wherein the composition of matter comprises a charge, the charge being the same as a charge of at least one of the drainage additive, the wet web strength additive, and the wet strength aid.

* * * * *

UNITED STATES PATENT AND TRADEMARK OFFICE
CERTIFICATE OF CORRECTION

PATENT NO. : 10,145,067 B2
APPLICATION NO. : 15/271441
DATED : December 4, 2018
INVENTOR(S) : Yulin Zhao et al.

Page 1 of 1

It is certified that error appears in the above-identified patent and that said Letters Patent is hereby corrected as shown below:

On the Title Page

Item (57) Abstract, Lines 7 and 8, delete "form adhering to a those additives." and insert -- from adhering to those additives. --, therefor.

Signed and Sealed this
Twenty-ninth Day of October, 2019

Andrei Iancu
*Director of the United States Patent and Trademark Office*